(12) United States Patent
Jeyapaul

(10) Patent No.: US 9,678,549 B2
(45) Date of Patent: Jun. 13, 2017

(54) SELECTIVELY UPLOADING APPLICATIONS TO A MOBILE DEVICE BASED ON POWER CONSUMPTION

(71) Applicant: INTERNATIONAL BUSINESS MACHINES CORPORATION, Armonk, NY (US)

(72) Inventor: Rajesh K. Jeyapaul, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/867,045

(22) Filed: Sep. 28, 2015

(65) Prior Publication Data

US 2017/0090535 A1    Mar. 30, 2017

(51) Int. Cl.
*G06F 1/26* (2006.01)
*H04L 29/08* (2006.01)
*H04W 4/00* (2009.01)

(52) U.S. Cl.
CPC ............... *G06F 1/26* (2013.01); *H04L 67/06* (2013.01); *H04W 4/003* (2013.01)

(58) Field of Classification Search
CPC ... G06F 1/32; G06F 1/26; G06F 1/329; H04L 67/06; H04W 4/003
See application file for complete search history.

(56) References Cited

U.S. PATENT DOCUMENTS

| 2010/0274507 | A1* | 10/2010 | Black | H04W 36/385 702/63 |
| 2011/0047594 | A1 | 2/2011 | Mahaffey et al. | |
| 2011/0145920 | A1* | 6/2011 | Mahaffey | G06F 21/564 726/22 |
| 2013/0138776 | A1* | 5/2013 | Yamashita | H04L 67/06 709/219 |
| 2014/0141768 | A1 | 5/2014 | Javaid et al. | |
| 2014/0365790 | A1* | 12/2014 | Chen | G06F 1/3212 713/300 |
| 2015/0026487 | A1 | 1/2015 | Choi et al. | |
| 2015/0039756 | A1 | 2/2015 | Agarwal et al. | |

* cited by examiner

*Primary Examiner* — Fahmida Rahman
(74) *Attorney, Agent, or Firm* — John R. Pivnichny; Law Office of Jim Boice

(57) ABSTRACT

A computer-implemented method, system, and/or computer program product controls downloading of an application to a mobile device based on power consumption of the application. A server receives a first power nameplate for a first application and a second power nameplate for a second application, a first priority rating of the first application and a second priority rating of the second application, a power descriptor that identifies an amount of power available to a mobile device, and a set of application downloading rules. The set of application downloading rules includes a soft rule, a hard rule, and a medium rule. The server then selectively uploads, to the mobile device, the first application or the second application based on a selected rule.

17 Claims, 4 Drawing Sheets

SELECTIVELY UPLOADING APPLICATIONS TO A MOBILE DEVICE BASED ON POWER CONSUMPTION

BACKGROUND

The present disclosure relates to the field of computing devices, and specifically to the field of mobile computing devices that are battery powered. Still more specifically, the present disclosure relates to the field of managing power consumption by applications that are loaded onto the mobile computing devices.

SUMMARY

A computer-implemented method, system, and/or computer program product controls downloading of an application to a mobile device based on power consumption of the application. A server receives a first power nameplate for a first application and a second power nameplate for a second application. The first power nameplate identifies a first power consumption level requirement of the first application, the second power-identifies a second power consumption level requirement of the second application, and the second power consumption level requirement is a lower power consumption level requirement than the first power consumption level requirement. The server receives a first priority rating of the first application and a second priority rating of the second application, where the first priority rating is a higher priority rating than the second priority rating. The server receives a power descriptor, from a mobile device, which identifies an amount of power available to the mobile device from a battery on the mobile device. The server receives a set of application downloading rules from the mobile device. The set of application downloading rules includes a soft rule, a hard rule, and a medium rule. The soft rule prioritizes downloading the first application over the second application based on the higher priority rating of the first application regardless of the higher power consumption level requirement of the first application. The hard rule prioritizes downloading the second application over the first application based on the lower power consumption level requirement of the second application regardless of the higher priority rating of the first application. The medium rule prioritizes downloading the second application over the first application in response to the amount of power available to the mobile device from the battery being below a predetermined value. The server receives a request from the mobile device to download the first application and the second application, as well as a rule selection message from the mobile device, which selectively chooses a selected rule from the soft rule, the hard rule, and the medium rule. The server then selectively uploads, to the mobile device, the first application or the second application based on the selected rule from the mobile device.

DETAILED DESCRIPTION

Figure 1:
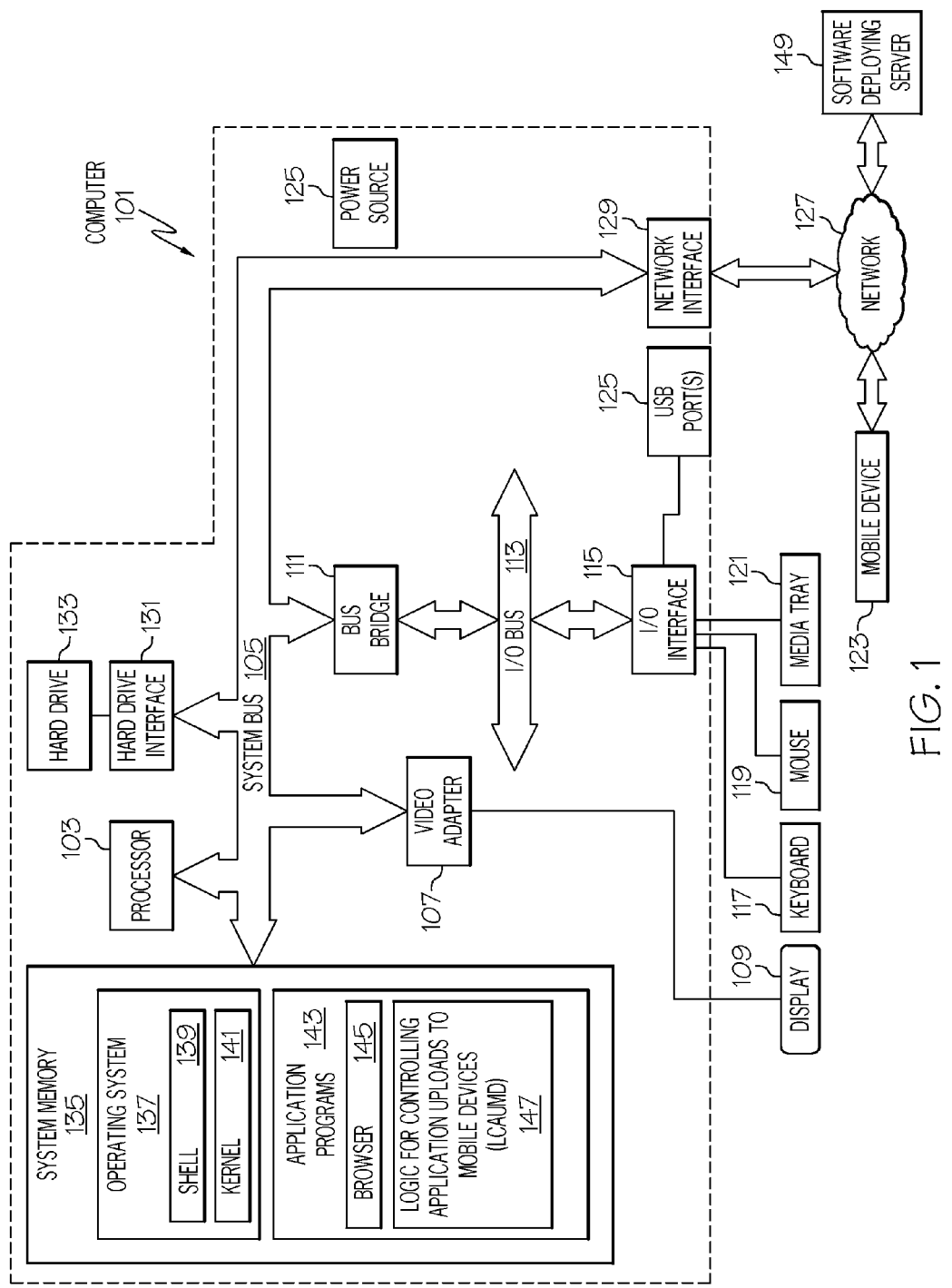
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or mobile device 123 shown in FIG. 1, and/or mobile device 223 depicted in FIG. 2, and/or mobile device 323 and/or server 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, and/or a media tray 121 (which may include storage devices such as CD-ROM drives, multi-media interfaces, etc.). While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129 to a network 127. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc. Network 127 may connect computer 101 to a mobile device 123 (e.g., a smart phone, a tablet computer, a laptop computer, or other electronic device that is battery operated) and/or a software deploying server 149.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Controlling Application Uploads to Mobile Devices (LCAUMD) 147. LCAUMD 147 includes code for implementing the processes described below, including those described in FIGS. 2-4.

Also within computer 101 is a power source 125. When plugged into a nearly unlimited power supply (e.g., a power grid from a power company), the power source 125 is the system of outlets, wires, transformers that support the power grid. However, when part of a mobile computing device such as mobile device 123, power source 125 is a battery.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
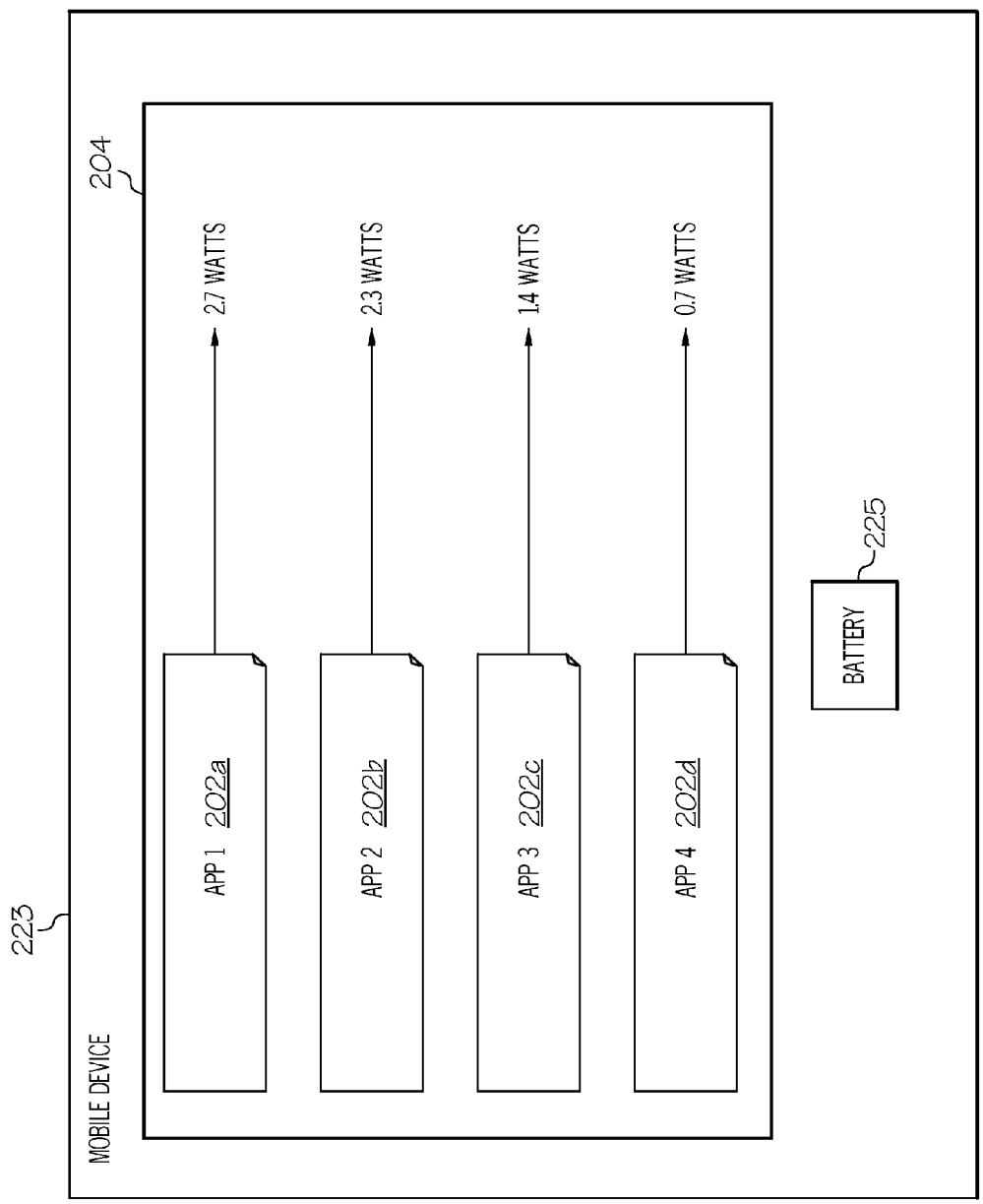
FIG. 2 illustrates a hashing of values represented by a set of visually-coded power nameplates in accordance with one or more embodiments of the present invention.

With reference now to FIG. 2, a hashing of values represented by a set of visually-coded power nameplates in accordance with one or more embodiments of the present invention is presented.

Assume that multiple applications 1-4 are running on mobile device 223 (analogous to mobile device 123 shown in FIG. 1). Each of the applications 1-4 consumes power from a battery (e.g., power source 125 shown in FIG. 1). The amount of power consumed by each of the applications 1-4 is represented by a corresponding power nameplate 202a-202d. Each of the power nameplates 202a-202d represent an amount of power that a mobile application can consume during peak usage. Thus, the amount of power used/shared is based on (1) the particular mobile applications, and (2) the name plate power (i.e. maximum power) consumed by the mobile applications.

As shown for explanatory purposes, application 1 consumes 2.7 Watts of power from the battery; application 2 consumes 2.3 Watts of power from the battery; application 3 consumes 1.4 Watts of power from the battery; and application 4 consumes 0.7 Watts of power from the battery. Since many batteries in mobile devices such as a smart phone only can store 5.0 Wh, running all of the applications 1-4 will fully deplete the battery in mobile device 223 in much less than one hour (e.g., approximately 40 minutes).

However, not all of the applications 1-4 may be running at all times. As such, a hash map 204 is generated. Hash map 204 is a calculation of the total amount of power consumed by applications 1-4 during some predefined period of time. Thus, assuming that all of the applications 1-4 are running simultaneously, then in 40 minutes they will use 5.0 Wh, and the battery will be depleted.

However, different applications from applications 1-4 may be turned on and off during some predefined period of time. For example, assume that the predefined period of time (for which power consumption will be calculated to create the hash map 204) is four hours. Assume further that application 1 only runs for 30 minutes during those four hours (and thus uses 1.35 Wh of power); application 2 only runs for 10 minutes during those four hours (and thus uses 0.4 Wh of power); application 3 only runs for 30 minutes during those four hours (and thus uses 0.7 Wh of power); and application 4 only runs for 2 hours during those four hours (and thus uses 1.4 Wh of power). As such, the total amount of power used by these four applications during the predefined period of time (hour hours) by applications 1-4 is 3.85 Wh (1.35+0.4+0.7+1.4=3.85 Wh).

Alternatively, the hash map 204 is just a peak power draw for the mobile device 223. That is, an energy monitor continuously monitors how much power is being consumed at any point in time. When a new peak in power consumption occurs, then the hash map 204 is updated (and stored in an offline cache 303 depicted in FIG. 3). For example, if mobile device 223 has a spike in power usage of 4.7 Watts, then 4.7 W is stored in the offline cache 303 in FIG. 3. However, if mobile device 223 later has a spike in power user of 5.3 Watts, then 5.3 W replaces the 4.7 W stored in offline cache 303.

In a preferred embodiment, hash map 204 is created within mobile device 223.

As shown in FIG. 2, mobile device 223 has a battery 225, which is any type of power storage device capable of storing electrical energy.

Figure 3:
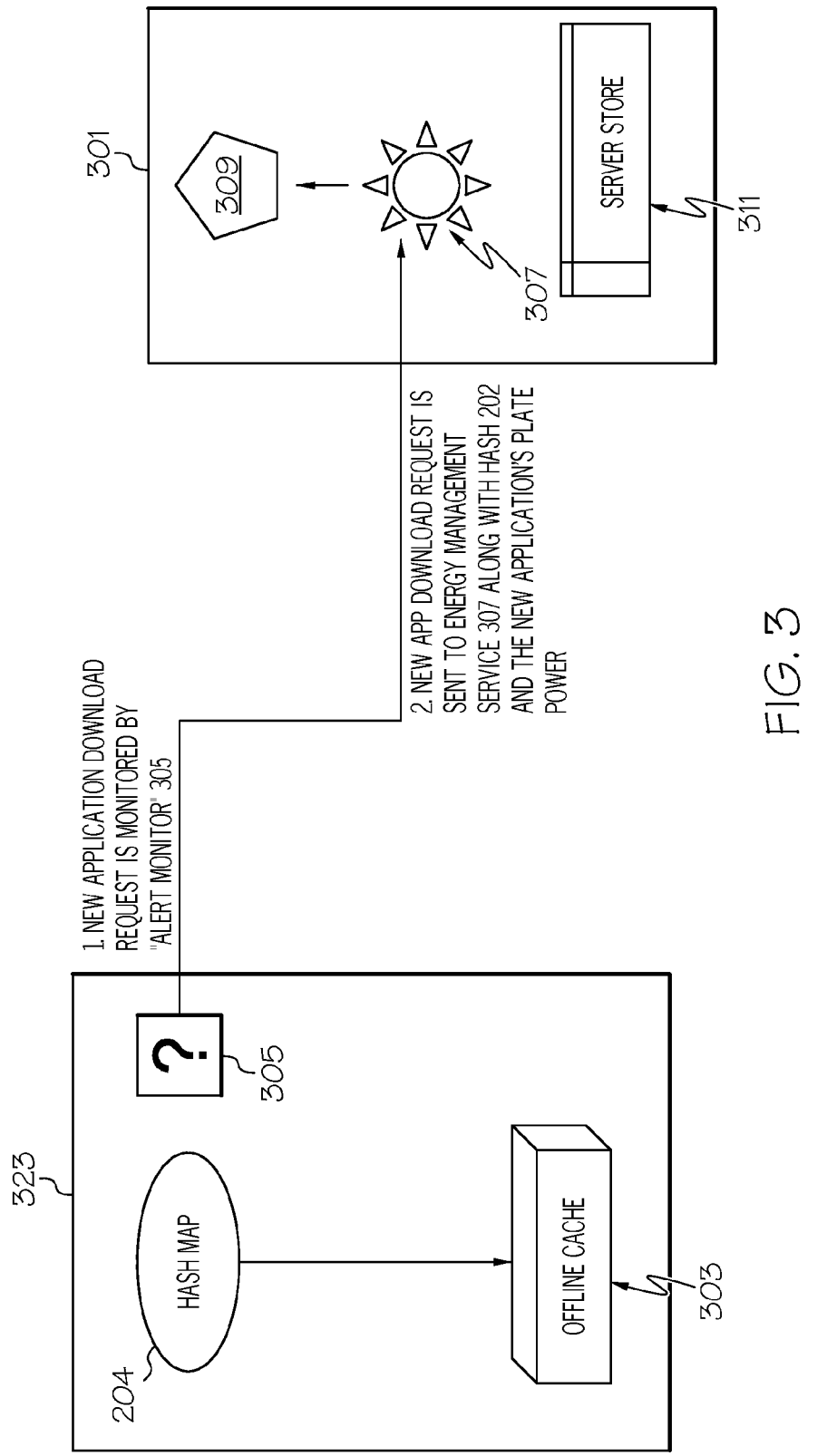
FIG. 3 depicts a relationship between a mobile device and a server in accordance with one or more embodiments of the present invention.

With reference now to FIG. 3, a relationship between a mobile device and a server in accordance with one or more embodiments of the present invention is represented.

As shown in FIG. 3, the hash map 204 discussed above from FIG. 2 is stored in an offline cache 303 within a mobile device 323 (analogous to mobile device 123 shown in FIG. 1 and mobile device 223 shown in FIG. 2). In order to conserve energy, the hash 204 is only created periodically (e.g., during certain non-contiguous periods of time) and then stored in an offline cache 303 (e.g., a non-volatile memory that does not draw power from the battery in the mobile device 323).

A user may wish to download an application onto the mobile device 323. This desire of the user is understood by mobile device 323 as an input from the user to a input device on the mobile. For example, the user may click a "Download now" button on a website that would download an application onto the mobile device 323.

Alternatively, logic within the mobile device 323 may autonomously request that an application be downloaded onto the mobile device 323. For example, one program (e.g., a graphics program) may need an audio program (e.g., an audio driver) to operate. If the audio driver is not installed on the mobile device 323, then the graphics program may automatically request that the audio driver be installed onto the mobile device 323.

Rather than directly performing such a download, however, an application download alert monitor 305 will request that an energy management service 307, which resides in a server 301 (analogous to computer 101 shown in FIG. 1), grant permission for and implement the uploading of the requested application to the mobile device 323.

As such, the application download alert monitor 305 sends to the energy management service 307 (1) an identifier of the requested/desired application; (2) that application's power nameplate (e.g., 2.7 Watts for application 1, as identified by power nameplate 202a); and (3) a hash from hash map 204 (i.e., a power-describing hash pulled from offline cache 303 for a predefined period of time in the past). This information is stored in the server store 311.

Note that hash map 204 shows the amount of power consumed by running applications on mobile device 323 during certain time periods. For example, one of the hashes stored in offline cache 303 may represent the amount of time used at night, while another of the hashes stored in the offline cache 303 may be for weekdays between 8:00 AM-9:00 AM. Thus, in one embodiment, the application download alert monitor 305 may also sent the energy management service 307 the specific hash of power consumption for a time period that the requested new application will be used.

As shown in FIG. 3, the energy management service 307 then alerts an alert service 309 of the request from mobile device 323 to download the new application, along with the (1) identifier of the requested/desired application, (2) the application's power nameplate, and (3) a hash from hash map 204. Alert service 309 then takes appropriate action, such as allowing the new application to be downloaded to the mobile device 323, blocking the new application from being downloaded to the mobile device 323, removing one or more applications from the mobile device in order to free up power needed by the new application, turning off (e.g., disabling) one or more applications from the mobile device in order to free up power needed by the new application, etc.

Figure 4:
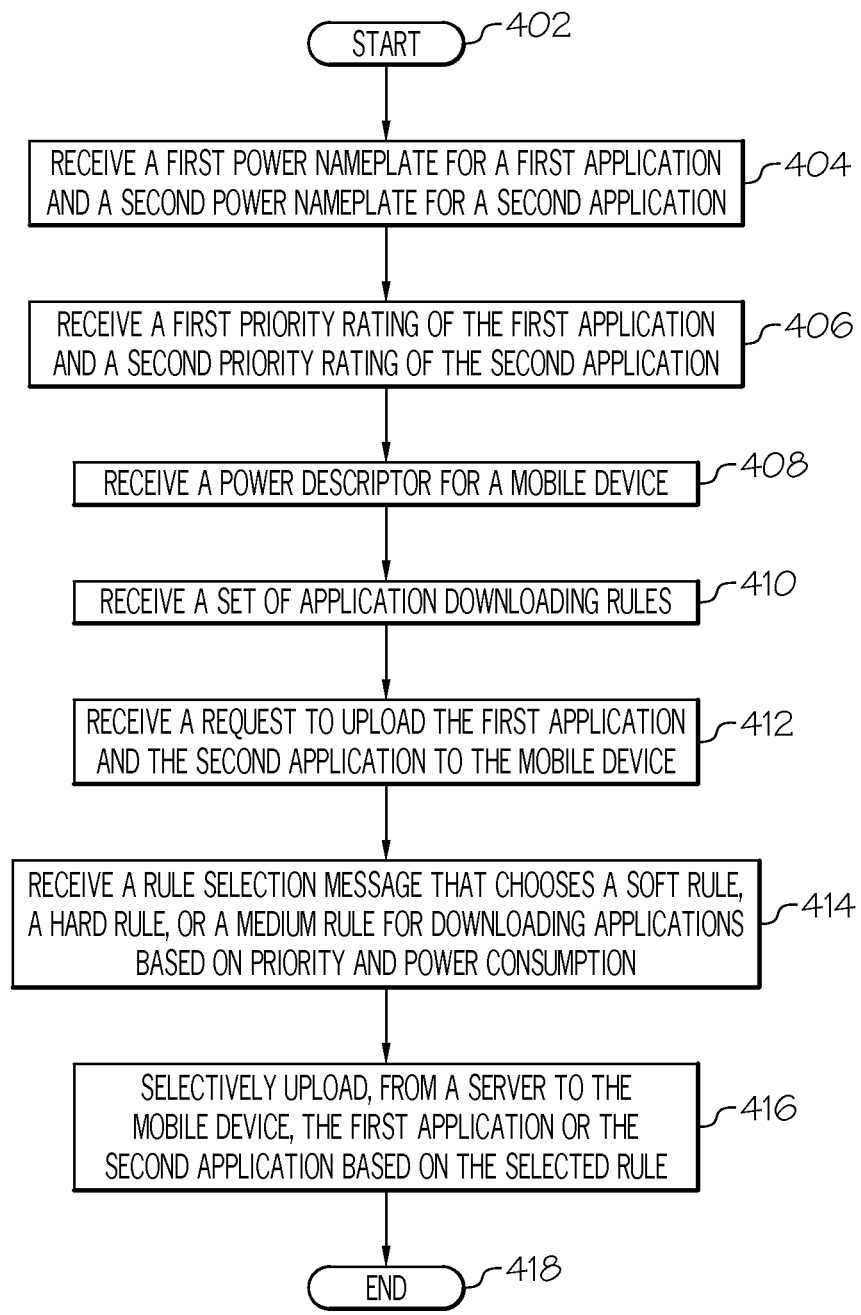
FIG. 4 is a high-level flow chart of one or more steps performed by one or more processors and/or other hardware to control downloading of an application to a mobile device based on power consumption of the application.

With reference now to FIG. 4, a high-level flow chart of one or more steps performed by one or more processors and/or other hardware to control downloading of an application to a mobile device based on power consumption of the application is presented.

After initiator block 402, a server (e.g., server 101 shown in FIG. 1, depicted as server 301 in FIG. 3) receives a first power nameplate (e.g., power nameplate 202a shown in FIG. 2) for a first application (e.g., application 1) and a second power nameplate (e.g., power nameplate 202b) for a second application (e.g., application 2), as described in block 404.

As described herein, the first power nameplate (which may be color-coded or otherwise visually coded) identifies a first power consumption level requirement of the first application (e.g., 2.7 W). The second power nameplate identifies a second power consumption level requirement of the second application (e.g., 2.3 W). As shown in FIG. 2, the second power consumption level requirement is a lower power consumption level requirement (2.3 W) than the first power consumption level requirement (2.7 W).

As described in block 406 in FIG. 4, the server also receives a first priority rating of the first application and a second priority rating of the second application, where the first priority rating is a higher priority rating than the second priority rating. For example, assume that the mobile device monitors a patient in a hospital, that application 1 shown in FIG. 1 has been predetermined to be mission critical (e.g., application 1 controls a life-support system for the patient), and that application 2 has been predetermined to be less than mission critical (e.g., application 2 merely monitors a room temperature of a room in which the patient is located). As such, application 1 has a higher priority rating than application 2.

As described in block 408, the server receives a power descriptor from the mobile device. The power descriptor identifies an amount of power available to the mobile device from a battery on the mobile device. For example, assume that mobile device 223 has a battery (depicted in FIG. 2 as battery 225). The power descriptor may be (1) a maximum power rating for the battery 225 (e.g., 5.0 Wh), and/or (2) a current amount of power available from battery 225 (e.g., 3.0 Wh, assuming that 2.0 Wh have already been drawn from battery 225).

As described in block 410, the server receives a set of application downloading rules. The set of application downloading rules includes a soft rule, a hard rule, and a medium rule.

The soft rule is defined as a rule that prioritizes downloading the first application over the second application based on the higher priority rating of the first application regardless of the higher power consumption level requirement of the first application. That is, if application 1 in FIG. 2 has a higher priority than application 2, then application 1 is allowed to be uploaded to the mobile device 223, even though it draws more power (2.7 W) than application 2 (2.3 W).

The hard rule is defined as a rule that prioritizes downloading the second application over the first application based on the lower power consumption level requirement of the second application regardless of the higher priority rating of the first application. That is, even though application 1 has a higher priority than application 2, the factor that application 1 consumes more power than application 2 is enough to cause the upload of application 2 before (and/or in lieu of) uploading application 1 to the mobile device 223.

The medium rule is defined as a rule that prioritizes downloading the second application over the first application in response to the amount of power available to the mobile device from the battery being below a predetermined value. For example, if only 2.5 Wh of energy are available from the battery 225 in mobile device 223, and an assumption is made that either application 1 or application 2 will be running for one hour, then application 2 will be uploaded to the mobile device 223, since it only requires 2.3 Wh of energy, which the battery 225 is able to provide. (Application 1 is not uploaded to mobile device 223, since battery 225 is not able to provide the needed 2.7 Wh of energy needed by application 1.)

As described in block 412, the server receives a request to upload the first application and the second application to the mobile device (e.g., mobile device 123 shown in FIG. 1, also depicted in FIG. 3 as mobile device 323). As described in block 414, the server also receives a rule selection message, which chooses a selected rule from the soft rule, the hard rule, and the medium rule. That is, the energy management service 307 (e.g., part of LCAUMD 147 shown in FIG. 1) and/or the mobile client 323 shown in FIG. 3 provide the server 301 with the rule selection message, directing the server 301 to obey/follow either the soft rule, the hard rule, or the medium rule described above.

As described in block 414, the server then selectively uploads, to the mobile device, the first application or the second application based on the selected rule, as described above.

The flow-chart from FIG. 4 ends at terminator block 418.

In an embodiment of the present invention, the server receives, from the energy management service 307 and/or the mobile device 323 shown in FIG. 3, a usage message. The usage message describes a prediction of an amount of time during a predefined time period that the mobile device will be running the first application. For example, application 1 shown in FIG. 2 may only be expected to run for only 10 minutes ("a prediction of an amount of time") during the present week ("a predefined time period"). This prediction may be based on analytics that describe how long and/or frequently application 1 is called upon to run based on other applications running within mobile device 223, the architecture of mobile device 223, etc.

The server then compares the amount of time during the predefined time period that the mobile device will be running the first application to a predetermined limit of time. In response to determining that the amount of time during the predefined time period that the mobile device will be running the first application is less than the predetermined limit of time, the server disregards the hard rule and uploads the first application to the mobile device. That is, even though application 2 uses less power than application 1, the hard rule (which requires applications that use less power to be uploaded before applications that use more power) is ignored, since the mobile device 223 has enough power to handle application 1 for the short amount of time that application 1 will be running ("less than the predetermined limit of time").

In one embodiment of the present invention, the server samples an average energy consumption by the mobile device for a predetermined sampling time interval (e.g., hash map 204 shown in FIG. 2). The server thus selects one of the hard rule, soft rule, and medium rule based on the average energy consumption by the mobile device for the predetermined sampling time interval. That is, an average amount of power consumed over time (rather than a maximum potential power consumption) determines which rule is applied. For example, even though applications 1-4 shown in FIG. 2 can possibly draw 7.1 Watts in an hour, if they run only intermittently (e.g., resulting in the "average energy consumption by the mobile device for a predetermined sampling time interval" that is only 2.0 Watts per hour), then the hard rule that would evict (or else prevent the uploading of) application 1 would not be relevant.

In an embodiment of the present invention, the selected rule is selected based on a priority level difference between the first priority rating and the second priority rating. That is, if the soft rule is applied, then the application with the higher priority (e.g., application 1) is selected over the application with the lower priority (e.g., application 2) only if there is enough of a difference between their priority levels. For example, assume that application 1 has been assigned a priority level of 1, and application 2 has been assigned a priority level of 2. As such, there is little difference in their priority levels, and there is little motivation to apply the soft rule (in which higher priority applications are uploaded before or instead of lower priority applications). As such, the hard rule will be selected and applied, and the application with the lower energy consumption (e.g., application 2) is selected over the application with the higher energy consumption (e.g., application 1).

However, if application 1 still has the priority level of 1, but application 2 now has the priority level of 10 (e.g., on a scale of 1-10, with 1 being the highest priority and 10 being the lowest priority), then there is great motivation to upload application 1 before or instead of application 2, since application 1 is so much more important than application 2. Thus, in this scenario, the soft rule will be selected and applied, and the application with the higher priority (e.g., application 1) is selected over the application with the lower priority (e.g., application 2).

In an embodiment of the present invention, assume that the first application has been uploaded to the mobile device. In this embodiment, the server determines that usage of the first application on the mobile device exceeds a predetermined value, and directs the mobile device to remove the first application from the mobile device. The server then uploads the second application to the mobile device. That is, if uploading application 1 (which uses a high level of power) overwhelms the battery 225 in FIG. 2, the application 1 is then removed from the mobile device 223, and is replaced with application 2, which uses less power.

In an embodiment of the present invention, assume that the server determines that the mobile device does not have sufficient battery power to operate a new application (e.g., application 1). If so, then the server deletes other applications that are already running on the mobile device, in order to free up enough power to run application 1.

Similarly, in one embodiment of the present invention, if a particular application that has been previously uploaded to the mobile device 223 has not run in more than a predefined amount of time (e.g., a particular application has not been called on to run within mobile device 223 in over a month), then that application is automatically purged (deleted) from the mobile device 223.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method to control downloading of an application to a mobile device based on power consumption of the application, the computer-implemented method comprising:

receiving, by a server, a first power nameplate for a first application and a second power nameplate for a second application, wherein the first power nameplate identifies a first power consumption level requirement of the first application, wherein the second power nameplate identifies a second power consumption level requirement of the second application, and wherein the second power consumption level requirement is a lower power consumption level requirement than the first power consumption level requirement;

receiving, by the server, a first priority rating of the first application and a second priority rating of the second application, wherein the first priority rating is a higher priority rating than the second priority rating;

receiving, by the server, a power descriptor from a mobile device, wherein the power descriptor identifies an amount of power available to the mobile device from a battery on the mobile device;

receiving, by the server, a set of application downloading rules, wherein the set of application downloading rules comprises a soft rule, a hard rule, and a medium rule, wherein the soft rule prioritizes downloading the first application over the second application based on the higher priority rating of the first application regardless of the higher power consumption level requirement of the first application, wherein the hard rule prioritizes downloading the second application over the first application based on the lower power consumption level requirement of the second application regardless of the higher priority rating of the first application, and wherein the medium rule prioritizes downloading the second application over the first application in response to the amount of power available to the mobile device from the battery being below a predetermined value;

receiving, by the server, a request to upload the first application and the second application to the mobile device;

receiving, by the server, a rule selection message, wherein the rule selection message selectively chooses a selected rule from the soft rule, the hard rule, and the medium rule; and selectively uploading, from the server to the mobile device, the first application or the second application based on the selected rule.

2. The computer-implemented method of claim 1, further comprising:

receiving, by the server, a usage message, wherein the usage message describes a prediction of an amount of time during a predefined time period that the mobile device will be running the first application;

comparing, by the server, the amount of time during the predefined time period that the mobile device will be running the first application to a predetermined limit of time; and in response to determining that the amount of time during the predefined time period that the mobile device will be running the first application is less than the predetermined limit of time, disregarding, by the server, the hard rule and uploading the first application to the mobile device.

3. The computer-implemented method of claim 1, further comprising:

sampling, by the server, an average energy consumption by the mobile device for a predetermined sampling time interval; and selecting, by the server, one of the hard rule, soft rule, and medium rule based on the average energy consumption by the mobile device for the predetermined sampling time interval.

4. The computer-implemented method of claim 1, wherein the selected rule is selected based on a priority level difference between the first priority rating and the second priority rating.

5. The computer-implemented method of claim 1, wherein the first application is uploaded to the mobile device, and wherein the computer-implemented method further comprises:

determining, by the server, that usage of the first application on the mobile device exceeds a predetermined value; and in response to determining that usage of the first application on the mobile device exceeds the predetermined value, directing, by the server, the mobile device to remove the first application from the mobile device and uploading, by the server, the second application to the mobile device.

6. The computer-implemented method of claim 1, further comprising:

determining, by the server, that the mobile device does not have sufficient battery power to operate a new application; and in response to determining that the mobile device does not have sufficient battery power to operate the new application, removing, by the server, one or more existing applications on the mobile device and uploading the new application to the mobile device.

7. A computer program product to control downloading of an application to a mobile device based on power consumption of the application, the computer program product comprising a non-transitory computer readable storage medium having program code embodied therewith, the program code readable and executable by a processor to perform a method comprising:

receiving a first power nameplate for a first application and a second power nameplate for a second application, wherein the first power nameplate identifies a first power consumption level requirement of the first application, wherein the second power nameplate identifies a second power consumption level requirement of the second application, and wherein the second power consumption level requirement is a lower power consumption level requirement than the first power consumption level requirement;

receiving a first priority rating of the first application and a second priority rating of the second application, wherein the first priority rating is a higher priority rating than the second priority rating;

receiving a power descriptor from a mobile device, wherein the power descriptor identifies an amount of power available to the mobile device from a battery on the mobile device;

receiving a set of application downloading rules, wherein the set of application downloading rules comprises a soft rule, a hard rule, and a medium rule, wherein the soft rule prioritizes downloading the first application over the second application based on the higher priority rating of the first application regardless of the higher power consumption level requirement of the first application, wherein the hard rule prioritizes downloading the second application over the first application based on the lower power consumption level requirement of the second application regardless of the higher priority rating of the first application, and wherein the medium rule prioritizes downloading the second application over the first application in response to the amount of power available to the mobile device from the battery being below a predetermined value;

receiving a request to upload the first application and the second application to the mobile device;

receiving a rule selection message, wherein the rule selection message selectively chooses a selected rule from the soft rule, the hard rule, and the medium rule; and selectively uploading, to the mobile device, the first application or the second application based on the selected rule.

8. The computer program product of claim 7, wherein the method further comprises:

receiving a usage message, wherein the usage message describes a prediction of an amount of time during a predefined time period that the mobile device will be running the first application;

comparing the amount of time during the predefined time period that the mobile device will be running the first application to a predetermined limit of time; and in response to determining that the amount of time during the predefined time period that the mobile device will be running the first application is less than the predetermined limit of time, disregarding the hard rule and uploading the first application to the mobile device.

9. The computer program product of claim 7, wherein the method further comprises:

sampling an average energy consumption by the mobile device for a predetermined sampling time interval; and selecting one of the hard rule, soft rule, and medium rule based on the average energy consumption by the mobile device for the predetermined sampling time interval.

10. The computer program product of claim 7, wherein the selected rule is selected based on a priority level difference between the first priority rating and the second priority rating.

11. The computer program product of claim 7, wherein the first application is uploaded to the mobile device, and wherein the method further comprises:

determining that usage of the first application on the mobile device exceeds a predetermined value; and in response to determining that usage of the first application on the mobile device exceeds the predetermined value, directing the mobile device to remove the first application from the mobile device and uploading the second application to the mobile device.

12. The computer program product of claim 7, wherein the method further comprises:

determining that the mobile device does not have sufficient battery power to operate a new application; and in response to determining that the mobile device does not have sufficient battery power to operate the new application, removing one or more existing applications on the mobile device and uploading the new application to the mobile device.

13. A computer system comprising:

a processor, a computer readable memory, and a non-transitory computer readable storage medium;

first program instructions to receive a first power nameplate for a first application and a second power nameplate for a second application, wherein the first power nameplate identifies a first power consumption level requirement of the first application, wherein the second power nameplate identifies a second power consumption level requirement of the second application, and wherein the second power consumption level requirement is a lower power consumption level requirement than the first power consumption level requirement;

second program instructions to receive a first priority rating of the first application and a second priority rating of the second application, wherein the first priority rating is a higher priority rating than the second priority rating;

third program instructions to receive a power descriptor from a mobile device, wherein the power descriptor identifies an amount of power available to the mobile device from a battery on the mobile device;

fourth program instructions to receive a set of application downloading rules, wherein the set of application downloading rules comprises a soft rule, a hard rule, and a medium rule, wherein the soft rule prioritizes downloading the first application over the second application based on the higher priority rating of the first application regardless of the higher power consumption level requirement of the first application, wherein the hard rule prioritizes downloading the second application over the first application based on the lower power consumption level requirement of the second application regardless of the higher priority rating of the first application, and wherein the medium rule prioritizes downloading the second application over the first application in response to the amount of power available to the mobile device from the battery being below a predetermined value;

fifth program instructions to receive a request to upload the first application and the second application to the mobile device;

sixth program instructions to receive a rule selection message, wherein the rule selection message selectively chooses a selected rule from the soft rule, the hard rule, and the medium rule; and seventh program instructions to selectively upload, to the mobile device, the first application or the second application based on the selected rule; and wherein the first, second, third, fourth, fifth, sixth, and seventh program instructions are stored on the non-transitory computer readable storage medium for execution by one or more processors via the computer readable memory.

14. The computer system of claim 13, further comprising:

eighth program instructions to receive a usage message, wherein the usage message describes a prediction of an amount of time during a predefined time period that the mobile device will be running the first application;

ninth program instructions to compare the amount of time during the predefined time period that the mobile device will be running the first application to a predetermined limit of time; and tenth program instructions to, in response to determining that the amount of time during the predefined time period that the mobile device will be running the first application is less than the predetermined limit of time, disregard the hard rule and uploading the first application to the mobile device; and wherein the eighth, ninth, and tenth program instructions are stored on the non-transitory computer readable storage medium for execution by one or more processors via the computer readable memory.

15. The computer system of claim 13, further comprising:

eighth program instructions to sample an average energy consumption by the mobile device for a predetermined sampling time interval; and ninth program instructions to select one of the hard rule, soft rule, and medium rule based on the average energy consumption by the mobile device for the predetermined sampling time interval; and wherein the eighth and ninth program instructions are stored on the non-transitory computer readable storage medium for execution by one or more processors via the computer readable memory.

16. The computer system of claim 13, wherein the first application is uploaded to the mobile device, and wherein the computer system further comprises:

eighth program instructions to determine that usage of the first application on the mobile device exceeds a predetermined value; and ninth program instructions to, in response to determining that usage of the first application on the mobile device exceeds the predetermined value, direct the mobile device to remove the first application from the mobile device and uploading the second application to the mobile device; and wherein the eighth and ninth program instructions are stored on the non-transitory computer readable storage medium for execution by one or more processors via the computer readable memory.

17. The computer system of claim 13, further comprising:

eighth program instructions for determining that the mobile device does not have sufficient battery power to operate a new application; and ninth program instructions for, in response to determining that the mobile device does not have sufficient battery power to operate the new application, removing one or more existing applications on the mobile device and uploading the new application to the mobile device; and wherein the eighth and ninth program instructions are stored on the non-transitory computer readable storage medium for execution by one or more processors via the computer readable memory.

\* \* \* \* \*